(12) United States Patent
Minhas et al.

(10) Patent No.: US 6,649,061 B2
(45) Date of Patent: Nov. 18, 2003

(54) MEMBRANE PROCESS FOR SEPARATING SULFUR COMPOUNDS FROM FCC LIGHT NAPHTHA

(75) Inventors: Bhupender S. Minhas, Bel Air, MD (US); Michael R. Chuba, Wrightstown, NJ (US); Robert J. Saxton, Pleasanton, CA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 10/021,800

(22) Filed: Dec. 12, 2001

(65) Prior Publication Data

US 2002/0111524 A1 Aug. 15, 2002

Related U.S. Application Data

(60) Provisional application No. 60/258,583, filed on Dec. 28, 2000.

(51) Int. Cl.[7] .............................. C02F 1/44; C02G 45/00
(52) U.S. Cl. ....................... 210/640; 210/649; 210/654; 585/818; 585/819; 208/209
(58) Field of Search ................................. 210/640, 654, 210/649, 650; 585/819, 818; 208/209

(56) References Cited

U.S. PATENT DOCUMENTS

| | | |
|---|---|---|
| 2,947,687 A | 8/1960 | Lee |
| 3,043,891 A | 7/1962 | Stuckey ..................... 260/674 |
| 3,556,991 A | 1/1971 | Gerhold ..................... 208/321 |
| 4,527,999 A | 7/1985 | Lee ................................ 55/16 |
| 4,532,029 A | 7/1985 | Black et al. ................. 208/308 |
| 4,612,019 A * | 9/1986 | Langshorst |
| 4,798,674 A | 1/1989 | Pasternak et al. ........... 210/640 |
| 4,802,987 A | 2/1989 | Black .......................... 210/640 |
| 4,846,977 A | 7/1989 | DeVellis et al. ............. 210/640 |
| 4,886,522 A | 12/1989 | Davidson et al. ............. 44/624 |
| 4,944,880 A | 7/1990 | Ho et al. ..................... 210/640 |
| 4,962,271 A | 10/1990 | Black et al. ................. 585/819 |
| 4,963,165 A | 10/1990 | Blume et al. ................... 55/16 |
| 4,997,906 A | 3/1991 | Thaler et al. ................ 528/272 |
| 5,019,666 A | 5/1991 | Sartori et al. ............... 585/819 |
| 5,055,631 A | 10/1991 | Sartori et al. ............... 585/819 |
| 5,288,712 A | 2/1994 | Chen ........................... 210/640 |
| 5,396,019 A | 3/1995 | Sartori et al. ............... 585/819 |
| 5,498,823 A | 3/1996 | Noble et al. ................. 585/818 |
| 5,635,055 A | 6/1997 | Sweet et al. ................... 208/99 |
| 5,643,442 A | 7/1997 | Sweet et al. ................. 208/302 |
| 5,905,182 A | 5/1999 | Streicher et al. ............ 585/804 |
| 2002/0153284 A1 | 10/2002 | White et al. ................ 208/209 |

* cited by examiner

*Primary Examiner*—Ana Fortuna
(74) *Attorney, Agent, or Firm*—Gerard J Hughes

(57) ABSTRACT

A process for the separation of sulfur compounds from a hydrocarbon mixture using a membrane is provided. Preferred hydrocarbon mixtures are oil refining fractions such as light cracked naphtha. Membranes are composed of either ionic or non-ionic materials and preferentially permeate sulfur compounds over other hydrocarbons. A single or multi-stage membrane system separates the hydrocarbon mixture into a sulfur-rich fraction and a sulfur-lean fraction. The sulfur-lean fraction may be used in fuel mixtures and the sulfur-rich fraction may be further treated for sulfur reduction.

19 Claims, 3 Drawing Sheets

Process For Desulfurization of Light Cracked Naphtha

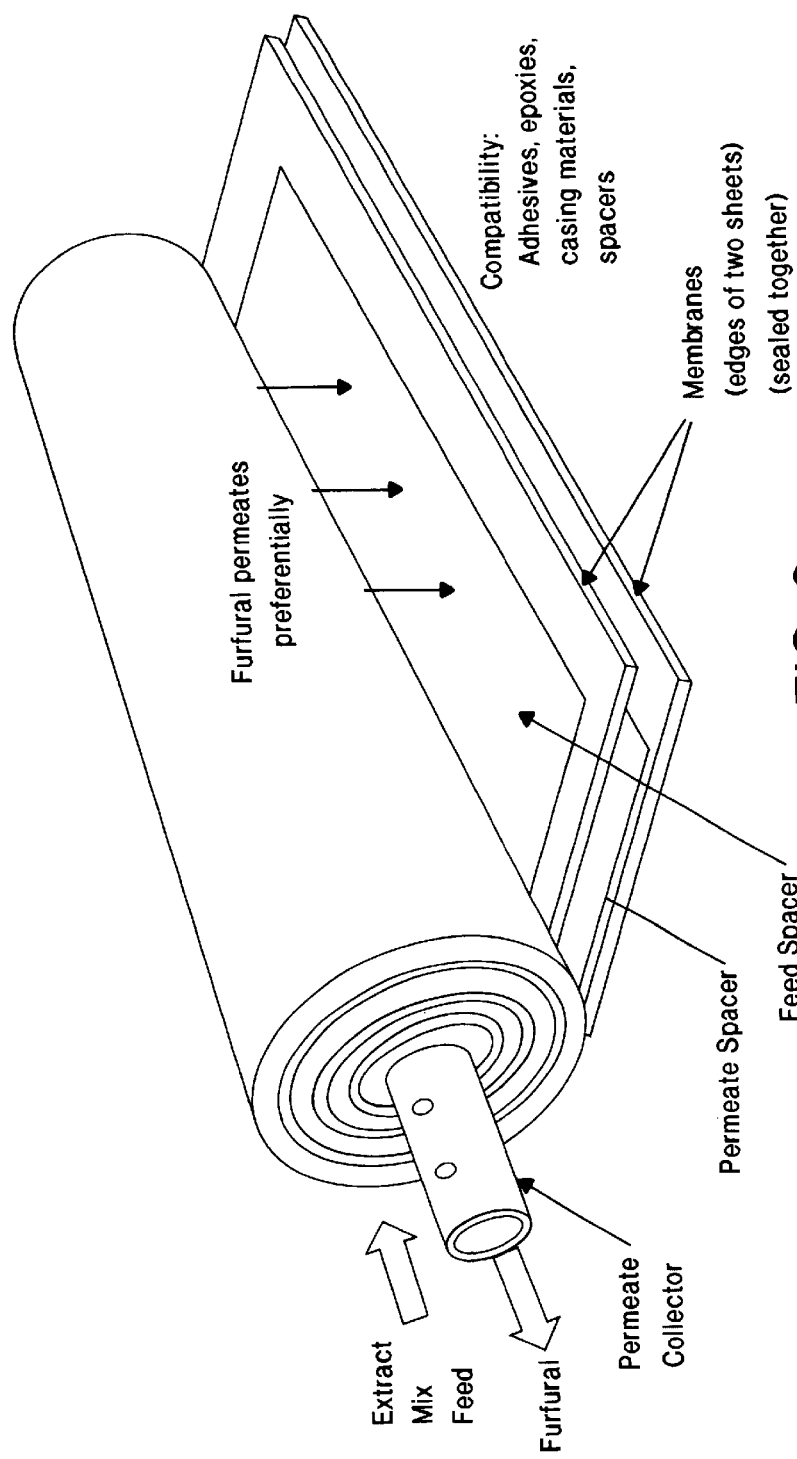

MEMBRANE PROCESS FOR SEPARATING SULFUR COMPOUNDS FROM FCC LIGHT NAPHTHA

CROSS REFERENCE TO RELATED APPLICATIONS

This application is based on Provisional U.S. Application No. 60/258,583 filed Dec. 28, 2000.

BACKGROUND OF THE DISCLOSURE

1. Field of the Invention

The present invention relates to a process for the separation of sulfur compounds from hydrocarbon mixtures using a membrane.

2. Background of the Invention

Sulfur compounds are impurities in gasoline that compromise vehicle emission controls by poisoning the catalytic converter. In an effort to further decrease emissions, the U.S. government has recently proposed a nationwide reduction of sulfur in gasoline from current levels at 300–1000 ppm to an average of 30 ppm (*Federal Register,* 64(92), May 13, 1999). Gasoline producers, both domestic and foreign, selling fuel in the U.S. would be expected to comply by the year 2004.

Presently, the conventional process for reducing sulfur content in gasoline involves hydrotreating in which sulfur compounds are converted to volatile hydrogen sulfide and other organics. This energy intensive process, requiring elevated temperature and pressure, is expensive for obtaining the proposed lowered sulfur levels. Alternative processes with more efficient sulfur-reducing technology are needed to maintain progress toward cleaner burning fuels.

The use of membrane separation technology, in which select compounds or types or compounds can be separated from an organic mixture by permeation through a membrane, has been reasonably well developed. Separation processes that incorporate membranes present an attractive option for large-scale purification of petroleum fractions because of their inherent simplicity, versatility, and low energy consumption.

Typically, membrane separation processes rely on the affinity of a specific compound or class of compounds for the membrane. In this way, the components of a mixture with specific affinity for the membrane will selectively sorb onto the membrane. The sorbed compounds diffuse, or permeate, through the membrane and are removed on the opposite side. Continual withdrawal of permeated compounds from the membrane maintains the driving force for the separation process. Removal of permeated compounds is usually achieved by pervaporation or perstraction methods. Pervaporation employs a vacuum on the permeate side of the membrane, removing the permeated compounds in gaseous form, while perstraction employs a liquid sweep stream, continually washing away permeate.

The chemical properties of the membrane dictate the type of compound that has affinity for it. Some types of membranes are composed of charged chemical groups and are, therefore, considered ionic in character. An example of an ionic membrane is Nafion® (available from DuPont, of Wilmington, Del.), which is a polymer of perfluorosulfonic acid that has been used principally in the dehydration of liquid organic mixtures as described in U.S. Pat. No. 4,846,977. Only few examples exist for the use of Nafion® in separating organic compounds. U.S. Pat. No. 4,798,764 describes the separation of methanol from dimethyl carbonate or methyl t-butyl ether. The use of Nafion® membranes for the separation of mixtures of styrene and ethylbenzene has also been reported (Cabasso, *Ind. Eng. Chem. Prod. Res. Dev.* 1983, 22, 313). U.S. Pat. No. 5,498,823 reports the enhanced separation of unsaturated organic compounds using silver ion-exchanged Nafion® membranes. A related ionic membrane composed of sulfonated polysulfone has been also used for the separation of aromatics and non-aromatics as disclosed in U.S. Pat. No. 5,055,631. To date, the use of ionic membranes, such as Nafion®, for the separation of sulfur compounds from liquid organic mixtures has not been reported.

In contrast to ionic membranes, non-ionic membranes are made from those materials lacking charged chemical groups. Chemical affinity for these membranes is usually governed by the hydrophilic or hydrophobic nature of the membrane material. Hydrophilic membranes have affinity for water or other polar compounds, and those membranes with affinity for water are often water-soluble. Hydrophilic membranes include both ionic and non-ionic membranes. However, the non-ionic membranes generally contain polar chemical groups such as hydroxyl, carboxyl, sulfonyl, carbonyl, or amine groups. Examples of hydrophilic non-ionic membranes include polyvinylalcohol (PVA), cellulose acetates, and polyvinylamine. Hydrophobic membranes, on the other hand, have little affinity for water or polar compounds and generally lack or contain a small proportion of charged or polar chemical groups. Examples of hydrophobic membranes include polyethylene and polystyrene.

A wide variety of non-ionic membranes have been used in separation processes. U.S. Pat. Nos. 5,905,182, 5,019,666, 4,997,906, 4,944,880, 4,532,029, 4,802,987, 4,962,271, 5,288,712, 5,635,055, 3,556,991, 3,043,891, and 2,947,687 describe the separation of aromatics from hydrocarbon mixtures using a wide variety of non-ionic membrane materials. Non-ionic membranes have also been used in the separation of aromatics containing heteroatoms from hydrocarbon mixtures as disclosed in U.S. Pat. Nos. 5,643,442 and 5,396,019. The aforementioned patents, which are incorporated herein by reference, disclose membrane separation processes directed to the separation of aromatics and non-aromatics using hydrophobic membranes.

The proposed mandate for lowered sulfur levels in gasoline has made it imperative to improve or replace existing methods for desulfurization of petroleum fractions. A more cost-effective method for reducing sulfur content in petroleum fractions is a primary goal of the oil refining industry. Current membrane separation technology shows potential for meeting future standards, but has not yet been used specifically for this purpose.

SUMMARY OF THE INVENTION

This invention relates to a process for the separation of sulfur compounds from hydrocarbon mixtures, preferably oil refining fractions, using a membrane. The membrane may be composed of any material, ionic or non-ionic, that preferentially permeates sulfur compounds over hydrocarbons. The hydrocarbon mixture is split by one or more membranes forming sulfur-rich and sulfur-lean fractions. The sulfur-lean fraction may be incorporated into fuel mixtures and the sulfur-rich fraction may undergo further treatment for reduction of sulfur levels.

The present invention provides a process for separating sulfur compounds from a hydrocarbon mixture containing at least one sulfur compound and hydrocarbons comprising the steps of:

(a) contacting said hydrocarbon mixture with a first compartment of a membrane module, said membrane module further comprising a second compartment and a hydrophilic membrane separating said first compartment and said second compartment;

(b) selectively permeating said sulfur compounds of said hydrocarbon mixture through said membrane such that a sulfur-rich fraction accumulates in said second compartment and a sulfur-lean fraction is retained in said first compartment; and (c) retrieving said sulfur-rich fraction from said second compartment and said sulfur-lean fraction from said first compartment.

The present invention also provides a process which further comprises the steps of:

(d) contacting said sulfu-rich fraction of step (c) with a first compartment of a further membrane module, said further membrane module comprising a second compartment and a hydrophilic membrane separating said first compartment and said second compartment;

(e) selectively permeating sulfur compounds of said sulfur-rich fraction of step (d) through said membrane such that a further sulfur-rich fraction accumulates in said second compartment and a further sulfur-lean fraction is retained in said first compartment; and (f) retrieving said further sulfur-rich fraction and said further sulfur-lean fraction;

(g) repeating steps (d), (e) and (f) using said sulfur-rich fraction until a final sulfur-rich fraction of desired sulfur content is obtained; and (h) retrieving said final sulfur-lean fraction.

BRIEF DESCRIPTION OF THE DRAWINGS

FIG. 3 is a diagram of a spiral wound membrane module.

DETAILED DESCRIPTION OF THE INVENTION

Figure 1:
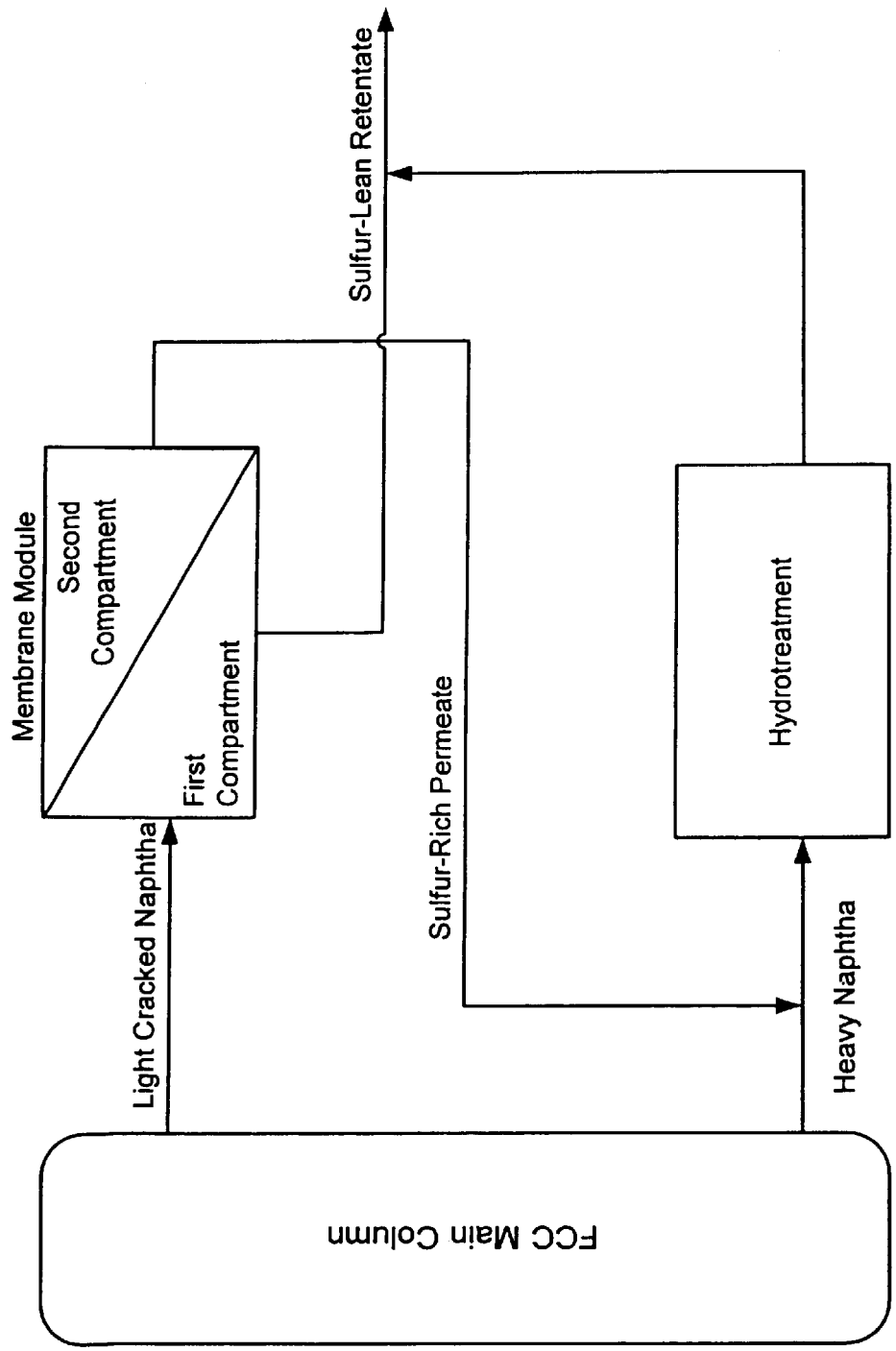
FIG. 1 is a schematic showing a process for the separation of sulfur compounds from light cracked naphtha using a membrane system.

As used herein, "hydrocarbon mixtures" means both synthetic mixtures and oil refining fractions, each of which contain sulfur compounds. Preferred hydrocarbon mixtures include FCC gasoline mixtures and light cracked naphthas (LCN). Hydrocarbons in the mixture encompass aliphatic, aromatic, saturated, and unsaturated compounds composed essentially of carbon and hydrogen. Preferred hydrocarbons are compounds that are commonly found in oil refining fractions including, but not limited to, benzene, toluene, napthenes, olefins and parrafins. The sulfur compounds in the hydrocarbon mixtures may be in any concentration, but levels of from about 1 ppm to about 10,000 ppm are preferred, and levels of from about 10 ppm to about 4000 ppm are more preferred. Also, the term "sulfur compounds" means inorganic or organic compounds comprising at least one sulfur atom. Preferably, sulfur compounds of the present invention are thiophenes and derivatives thereof.

As used herein, "permeate" refers to the portion of the hydrocarbon mixture that diffuses across a membrane, and "retentate" refers to the portion of the hydrocarbon mixture that does not pass through the membrane. Accordingly, the term "permeate side" refers to that side of the membrane on which permeate collects which is also the second compartment of the membrane module. The term "retentate side" refers to that side of the membrane which contacts the hydrocarbon mixture and also refers to the first compartment of the membrane module. In addition, the term "sulfur-rich" means having an increased content of sulfur relative to the hydrocarbon mixture and "sulfur-lean" means having a decreased content of sulfur relative to the hydrocarbon mixture.

According to the present invention, the term "perstraction" refers to a method for removing permeate from a membrane module involving a liquid sweep stream. In perstraction, a liquid sweep stream is passed through the second compartment of the membrane module, or permeate side of the membrane, preferably countercurrent to the direction of flow of the hydrocarbon mixture on the retentate side. The permeate dissolves into the sweep stream and is carried away by the flow, thereby preventing the accumulation of preferentially permeated components such as sulfur compounds. The sweep liquid preferably has affinity for, and is miscible with, the permeated components. Methanol is a preferred sweep liquid for membrane systems employing Nafion®-type membranes as it would also serve as a transport agent for enhancing flux and selectivity of the membrane.

As used herein, the term "pervaporation" refers to another method of removing permeate from the membrane module. In this method, the permeate is removed from the permeate side of the membrane as a vapor. Thus, a vacuum or lowered pressure must be maintained on the permeate side such that permeated components of the mixture will vaporize upon transfer across the membrane. Transfer of the permeable components across the membrane is ultimately driven by the difference in vapor pressure between the liquid hydrocarbon mixture on the retentate side of the membrane and the partial pressure of the permeate vapor on the permeate side of the membrane.

As used herein, "hydrophilic" means having an affinity for water or polar compounds. Additionally, "ionic" means having acidic or charged chemical groups and "non-ionic" means having neutral chemical groups.

According to the present invention, "membrane system" is a component of a process that preferentially separates sulfur compounds from hydrocarbon mixtures. The membrane system is single-staged comprising one membrane module, or multi-staged, comprising more than one membrane module. "Membrane module" refers to a membrane assembly comprising a membrane, feed and permeate spacers, and support material, assembled such the membrane separates a first compartment from a second compartment. The membrane module may be formed in any workable configuration such as flat sheet, hollow fibers, or spiral-wrapped.

As used herein, "transport agent" refers to an additive in the hydrocarbon mixture for augmenting flux and selectivity of the separating membrane. Transport agents include, but are not limited to, alcohols, glycols, ethers or any other compounds that are miscible with hydrocarbon mixtures, are sorbed by the ionic membrane, and increase flux through the membrane. Preferred transport agents are alcohols. A low boiling transport agent such as methanol is a more preferred transport agent because of ease of removal by distillation. The quantity of transport agent added to the hydrocarbon mixture is preferably about 1% to about 20% by weight.

Addition of about 10% by weight of methanol is more preferred. The transport agent also may comprise the sweep stream in perstraction processes.

As used herein, "Nafion®-type membrane" refers to a polymer of perfluorosulfonic acid or a derivative thereof. Derivatives include, but are not limited to, Nafion®-type membranes having undergone ion-exchange or reaction with organic bases. "Nafion," according to L. Gardner's *Chemical Synonyms and Tradenames*, $9^{th}$ ed., 1989, is defined as a perfluorosulphonic acid membrane (DuPont).

The hydrocarbon mixtures treated by the present invention encompass both synthetic mixtures and authentic oil refining fractions, each of which contain sulfur compounds. Preferable hydrocarbon mixtures include FCC gasoline mixtures and light cracked naphthas (LCN). The sulfur compounds in the hydrocarbon mixtures may be in any concentration, but levels of from about 1 ppm to about 10,000 ppm are preferred, and levels of from about 10 ppm to about 4000 ppm are more preferred. Sulfur compounds include organic and inorganic compounds. Preferred sulfur compounds are organic compounds. More preferred sulfur compounds are thiophenes and derivatives thereof. Hydrocarbons in the mixture include, but are not limited to, aliphatic, aromatic, saturated and unsaturated compounds composed essentially of carbon and hydrogen. Preferred hydrocarbons are compounds that are commonly found in oil refining fractions including, but not limited to, benzene, toluene, naphthenes, olefins and paraffins.

A transport agent may be optionally added to the hydrocarbon mixture to augment flux and selectivity of the separating membrane. Preferred transport agents include, but are not limited to, alcohols, glycols, ethers or any other compounds that are miscible with hydrocarbon mixtures and enhance flux through a membrane. More preferred transport agents are alcohols. A low boiling transport agent such as methanol is even more preferred. The quantity of transport agent added to the hydrocarbon mixture is preferably about 1% to about 20% by weight. Addition of about 10% by weight of methanol is more preferred.

According to the present invention, membrane separation of sulfur compounds from hydrocarbon mixtures involves the selective permeation, or diffusion, of sulfur compounds through a membrane. Generally, select diffusion of components of a mixture is controlled by the affinity of the components for the membrane. Components having greater affinity for the membrane permeate more rapidly. Thus, in the present invention, membranes which have affinity for, or preferentially permeate, sulfur compounds are preferred. Membranes can be of any suitable composition, and incorporate either or both inorganic and organic materials. Membranes may also possess either ionic or non-ionic properties. Ionic membranes generally contain charged chemical groups including salts and acids, while non-ionic membranes contain neutral chemical groups.

Preferred ionic membranes according to the present invention include Nafion®-type acidic membranes, such as Nafion® 117, that have been optionally treated by ion-exchange reactions or with bases. Nafion® belongs to a class of solid superacids that generally exhibit acid strength greater than 100% sulfuric acid. Nafion® is strongly hydrophilic. Nafion® is preferred for selectively permeating sulfur compounds which are generally more polar than other components of petroleum fractions and other hydrocarbon mixtures. Ion-exchanged Nafion® membranes, in which the acidic protons are replaced by other cations, are also within the scope of this invention. Examples of suitable cations include, but are not limited to, inorganic ions such as silver, copper, sodium, and organic ions such as tetraalkylammoniums and tetraalkylphosphoniums. In another aspect of the present invention, the Nafion®-type membranes may be treated with organic bases including, but not limited to, triethanolamine and pyridine, thereby forming organic salts. Nafion®-type membrane modification by reaction with organic bases results in increased selectivity for sulfur compounds over saturates and olefins.

Ionic membranes generally perform best in the presence of a transport agent. For example, when a Nafion®-type membrane is contacted with a transport agent, it swells from sorbtion of the transport agent, changing the microstructure of the polymer such that flux through the membrane is enhanced. Transport agents preferably include alcohols, glycols, ethers or any other compounds that are miscible with hydrocarbon mixtures, are sorbed by the ionic membrane, and increase flux through the membrane.

Non-ionic membranes are also suitable for the present invention. Preferred membranes are composed of hydrophilic materials including, but not limited to, cellulose triacetate (CTA) and polyvinylpyrrolidone (PVP). Hydrophilic properties generally enhance the selective membrane permeation of sulfur compounds in hydrocarbon mixtures. Furthermore, no transport agent is generally required to observe reasonable levels of flux and selectivity when using non-ionic membranes. In fact, the PVP and CTA membranes show a surprising, but desirable, simultaneous increase in flux and selectivity upon increasing temperature of feed. This result is in contrast to what has been observed for hydrophobic membranes, such as polyimides, under similar conditions which usually show a decrease in selectivity and an increase in flux with increasing temperature.

Other types of membranes include inorganic membranes comprising ceramics, inorganic oxides, metal foils, or carbon.

The present invention encompasses a process for the separation of sulfur compounds from hydrocarbon mixtures. According to the process, a hydrocarbon mixture is divided into a sulfur-rich fraction, i.e., sulfur-rich permeate, and a sulfur-lean fraction, i.e., sulfur-lean retentate, using a membrane system. The sulfur-rich fraction, or sulfur-rich permeate, corresponds to the portion of the hydrocarbon mixture that diff-used through the membrane. The sulfur-lean fraction, or sulfur-lean retentate, corresponds to the portion of the dhydrocarbon mixture that did not pass through the membrane. The hydrocarbon mixture treated by the process is preferably light cracked naphtha (LCN); however, any oil refining fraction or organic mixture contaminated with sulfur compounds is suitable. The sulfur compounds in the hydrocarbon mixtures may be in any concentration, but levels of from about 1 ppm to about 10,000 ppm are preferred, and levels of from about 10 ppm to about 4000 ppm are more preferred.

Incorporated into the membrane separation process is a membrane system which separates sulfur compounds from hydrocarbon mixtures. The membrane system can be single-staged comprising one membrane module, or multi-staged comprising more than one membrane module. Each module has at least two compartments, a first compartment and a second compartment, separated by a membrane assembly, the assembly preferably comprising a membrane, feed spacers, and support material. The first compartment receives the hydrocarbon mixture in liquid form while the second compartment collects the portion of the hydrocarbon mixture that has permeated through the membrane. The permeate is removed from the second compartment to maintain a chemical gradient that drives the transfer of sulfur compounds across the membrane.

Removal of the permeate is accomplished by either perstraction or pervaporation. In perstraction, a liquid sweep stream is passed through the second compartment of the membrane module, preferably countercurrent to the direction of flow of the hydrocarbon mixture in the first compartment. The permeate dissolves into the sweep stream and is carried away by the flow, thereby preventing the accumulation of preferentially permeated components such as sulfur compounds. The sweep liquid preferably has affinity for, and is miscible with, the permeated components. Methanol is a preferred sweep liquid for membrane systems employing Nafion®-type membranes as it would also serve as a transport agent for enhancing flux and selectivity of the membrane.

Under pervaporative conditions, the permeate is removed from the second compartment as a vapor. Thus a vacuum or lowered pressure must be maintained in the second compartment such that permeate will vaporize upon transfer across the membrane. The driving force for transport across the membrane is the difference in vapor pressure between the liquid hydrocarbon mixture and the permeate partial pressure. Vaporized permeate can be subsequently condensed with a chiller. The vapor is cooled and condensed to a liquid and may be optionally heated prior to delivery to subsequent membrane modules. A detailed discussion of perstraction and pervaporation can be found in *Membrane Handbook,* W. S. Ho and K. K. Sirkar, Eds., Chapman and Hall, 1992, herein incorporated by reference.

According to the present invention, the permeate is enriched in sulfur and corresponds to the sulfur-rich fraction. The retentate is depleted in sulfur and corresponds to the sulfur-lean fraction. In a multi-stage membrane system, the permeate of the initial membrane module may be optionally treated by another membrane module, and the permeate of that module further treated by another, proceeding indefinitely until a desired sulfur concentration is obtained in the permeate. The sulfur-lean retentate, exiting the membrane system preferably contains about 1 ppm to about 300 ppm sulfur, more preferably about 1 ppm to about 100 ppm, and most preferably about 1 ppm to about 50 ppm. The sulfur-lean fraction ideally can be used directly in fuel formulation. Permeate can be combined with other sulfur-containing hydrocarbon mixtures, such as heavy cracked naphtha (HCN), for conventional removal of sulfur compounds by hydrotreating. The hydrotreated stream can be optionally combined with the sulfur-lean fraction for further refining or fuel formulation.

Membrane modules are of reasonable size and shape, including hollow fibers, stretched flat sheet, or preferably, spiral-wound envelopes. In the spiral-wound configuration (FIG. 3), the open sides of membrane envelopes are positioned and sealed over a permeate receptacle such as perforated piping. The envelopes are spirally wrapped around the receptacle to minimize volume. Feed spacers, such as, for example, plastic netting or nylon mesh, separate the membrane envelopes to allow penetration of the hydrocarbon mixture between the wrapped layers. The interior of each membrane envelope is fitted with a permeate spacer to channel permeate toward the receptacle. The permeate spacer is composed of a material that is flexible, porous, and inert such as polyester. The membrane preferably is a composite comprising a stiff but flexible porous backing which is directed toward the inside of the envelope. Backing materials are preferably resistant to organic mixtures and include polyester, ceramic, glass, paper, plastic, or cloth. Cushions composed of a flexible, inert material may flank either side of the permeate spacer inside the membrane envelope and contribute to structural integrity of the membrane assembly under applied pressure.

The membrane itself preferably possesses certain qualities to function effectively in a process for separating sulfur compounds from hydrocarbon mixtures. In addition to selectivity for sulfur compounds, desirable membrane qualities include resistance to operative conditions such as thermal stress, sustained pressure, and prolonged contact with organic chemical mixtures. Membrane thickness may vary from about 0.1 microns to about 200 microns, but thinner membranes are preferred for maximum flux such as, for example, membranes having a thickness of about 0.1 microns to about 50 microns, or more preferably, about 0.1 microns to about 1 micron.

Preferred non-ionic membranes of the present invention are fabricated according to a proprietary method developed by Membrane Technology and Research, Inc. (MTR) of Menlo Park, Calif. MTR membrane designs are disclosed in U.S. Pat. Nos. 4,931,181; 4,963,165; 4,990,255; and 5,085,776, which are also incorporated herein by reference. These membranes are composite membranes prepared in a two-step process. The first step involves the deposition of a microporous support layer, comprising polysulfones, polyimides, or polyamides, onto a flexible porous backing made of an inert material (i.e., polyester fabric, ceramic, glass, paper, plastic, or cotton). The second step involves coating the microporous layer with a dilute solution of polymer, resulting in a thin, defect-free, selectively permeable layer which is responsible for the selectivity of the membrane.

Typical process conditions according to the present invention depend on several variables including membrane separation method (i.e., pervaporation vs. perstraction) and feed composition. Determination of appropriate pervaporative and perstractive operating conditions is well within the capabilities of one skilled in the art. Some typical operating parameters for perstractive processes of the present invention include feed flow rates of from about 30 to about 50 gpm, absolute membrane flux of from about 0.5 to about 150 $kg \cdot m^{-2} \cdot D^{-1}$, feed temperature of from about 20° C. to about 300° C., and negligible pressure drop across the membrane. Additionally, some typical operating parameters for pervaporative processes of the present invention include feed flow rates of from about 30 to about 50 gpm, absolute membrane flux of from about 0.5 to about 150 $kg \cdot m^{-2} \cdot D^{-1}$, feed temperature of from about 20° C. to about 300° C., and lowered pressure on the permeate side measuring from about 1 to about 80 mmHg.

Advantages of the present invention are numerous. The separation of sulfur compounds from hydrocarbon mixtures such as oil refining fractions allows the concentration of sulfur contaminants such that a smaller total volume of liquid needs to be processed by conventional hydrotreating. Additionally, selectivity of the membrane for sulfur compounds over unsaturated hydrocarbons results in a low olefin content in the sulfur-rich stream and reduced octane loss and hydrogen consumption during the hydrotreating process.

Those skilled in the art will appreciate that numerous changes and modifications may be made to the preferred embodiments of the present invention, and that such changes and modifications may be made without departing from the spirit of the invention. It is, therefore, intended that the appended claims cover all such equivalent variations as fall within the true spirit and scope of the present invention.

EXAMPLES

Example 1

Pervaporative Process for Reducing Sulfur Content in Light Cracked Naphtha Using a Membrane System This process is outlined in FIG. 1. Light cracked naphtha (LCN) originating from an FCC main column and containing 1990 ppm of sulfur is fed at a rate of 35 gpm into a membrane system and maintained at a pressure of 50 psig. The membrane system is composed of one spiral-wrapped membrane module. The membrane comprises a thin layer of polyvinylpyrrolidone (PVP), derived from a 0.5% aqueous PVP solution, layered on porous polyvinylidenefluoride. The permeate side of the membrane module is held under vacuum at a pressure of 50 mm Hg. Sulfur-rich permeate vapor exits the membrane system and is condensed with a chiller operating at 80° F. The liquid is combined with heavy cracked naphtha (HCN) derived from the FCC main column, and the mixture is processed by conventional hydrotreating. The sulfur-lean retentate exiting the membrane system, containing about 120 ppm sulfur, is combined with the hydrotreated fraction of similar sulfur content. The combined streams are used directly in the gasoline pool, diluted by two volume equivalents ultimately giving a fuel product with 30 ppm sulfur content.

Example 2

Perstractive Process for Reducing Sulfur Content in Light Cracked Naphtha Using a Membrane System Light cracked naphtha originating from an FCC main column and containing 1700 ppm sulfur is fed at a rate of 35 gpm into a membrane system at ambient pressure. The membrane system is composed of one membrane module, and the membrane has a thickness of about 50 microns and comprises Nafion® 117 supported on woven polyester. A sweep stream composed of methanol is fed to the permeate side of the membrane at a rate of 35 gpm at ambient pressure. The sulfur-rich permeate, containing about 1 weight % of sulfur, mixes with the methanol sweep stream. The resulting mixture is fed to a distillation unit in which the methanol is removed from the sulfur-rich permeate. The distilled sulfur-rich permeate is combined with heavy cracked naphtha (HCN) from the FCC main column and hydrotreated. Similarly, the sulfur-lean retentate, containing about 150 ppm sulfur and 5 weight % methanol, exiting the membrane system, is fed to a separate distillation unit in which the methanol is removed. The resulting methanol-lean retentate fraction is used in gasoline mixtures after combining with hydrotreated HCN.

Example 3

Figure 2:
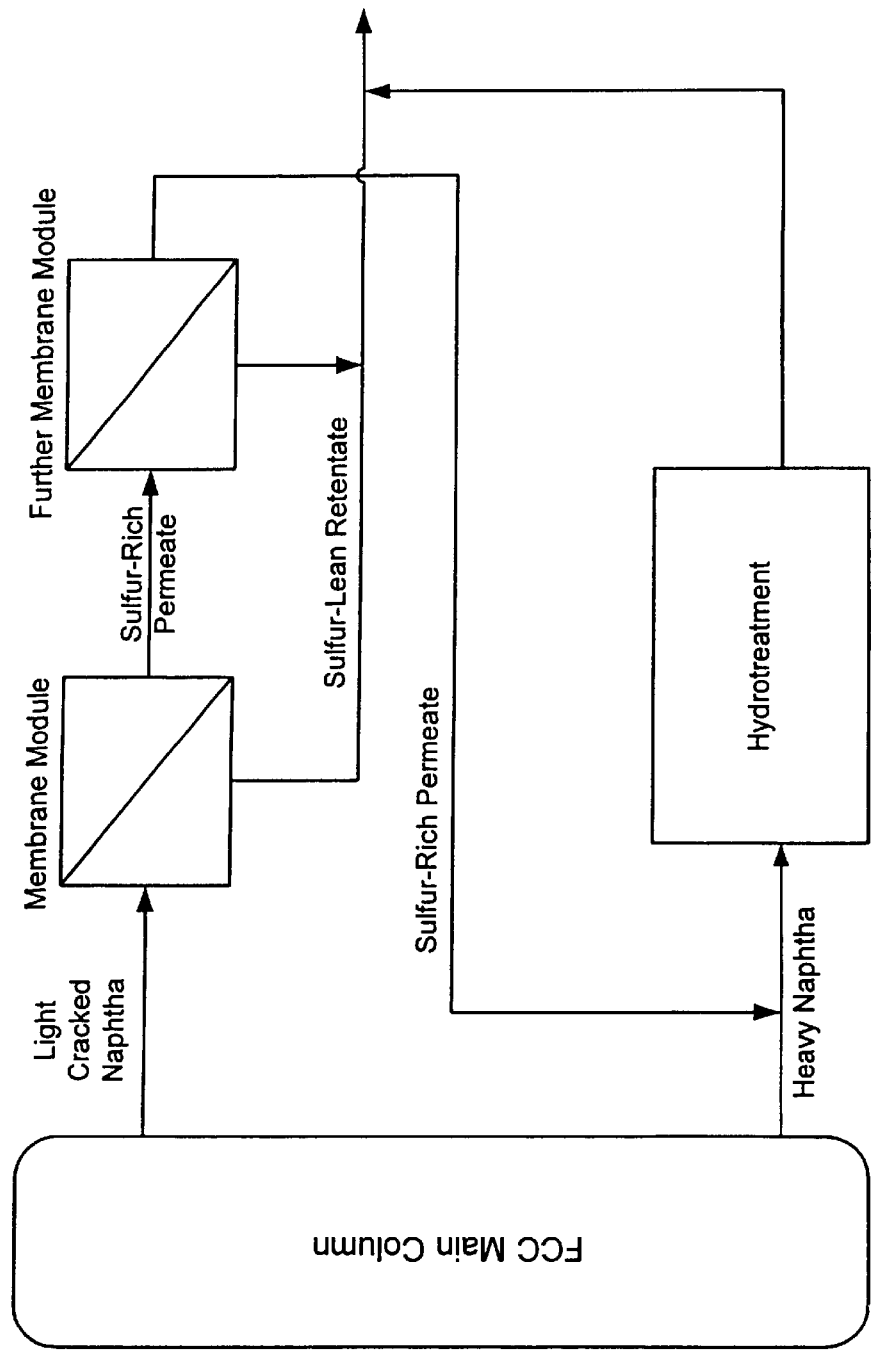
FIG. 2 is a schematic showing a process for the separation of sulfur compounds from light cracked naphtha using a multi-staged membrane system under pervaporative conditions.

Multi-Stage Pervaporative Process for Reducing Sulfur Content in Light Cracked Naphtha (LCN) Using a Membrane System This process is outlined in FIG. 2. LCN originating from an FCC main column containing 1880 ppm sulfur is fed to a membrane system. The membrane system is composed of two membrane modules, a first stage membrane module and a second stage membrane module. Both modules are operated under pervaporative conditions and have a membrane comprising cellulose triacetate (CTA) mounted on porous polyvinylidenefluoride. LCN initially enters the first module on the retentate side of the membrane and sulfur-rich permeate vapor, containing about 0.5% by weight sulfur, is drawn out of the permeate side. First stage permeate vapor is condensed with a chiller and heated to a temperature of 120° C. before entering the second stage membrane module on the retentate side of the membrane. As in the first stage module, the permeate from the second stage module is drawn away as a vapor and condensed. Sulfur content of the permeate from the second stage module is enriched to 0.93% by weight. The sulfur-rich permeate from the second stage module is mixed with HCN (1 weight % sulfur) from the FCC main column and hydrotreated. The hydrotreated mixture, containing about 150 ppm sulfur, is combined with retentate from both of the membrane modules for a combined sulfur content of about 150 ppm.

What is claimed is:

1. A process for separating sulfur compounds from a liquid hydrocarbon mixture containing at least one organic sulfur compound and hydrocarbons comprising the steps of:
   (a) contacting said hydrocarbon mixture with a first compartment of a membrane module, said membrane module further comprising a second compartment and a hydrophilic membrane separating said first compartment and said second compartment;
   (b) selectively permeating said sulfur compounds of said hydrocarbon mixture through said membrane such that a sulfur-rich fraction collects in said second compartment and a sulfur-lean fraction is retained in said first compartment; and
   (c) retrieving said sulfur-rich fraction from said second compartment and said sulfur-lean fraction from said first compartment.

2. The process of claim 1 further comprising the steps of:
   (d) contacting said sulfur-rich fraction of step (c) with a first compartment of a further membrane module, said further membrane module comprising a second compartment and a hydrophilic membrane separating said first compartment and said second compartment;
   (e) selectively permeating sulfur compounds of said sulfur-rich fraction of step (d) through said membrane such that a further sulfur-rich fraction accumulates in said second compartment and a further sulfur-lean fraction is retained in said first compartment; and
   (f) retrieving said further sulfur-rich fraction and said further sulfur-lean fraction;
   (g) repeating steps (d), (e) and (f) using said sulfur-rich fraction until a final sulfur-rich fraction of desired sulfur content is obtained; and
   (h) retrieving said final sulfur-lean fraction.

3. The process of claim 2 wherein said hydrophilic membrane is a non-ionic membrane.

4. The process of claim 3 wherein said membrane comprises polyvinylpyrrolidone.

5. The process of claim 3 wherein said membrane comprises cellulose triacetate.

6. The process of claim 2 wherein said hydrophilic membrane is a water-soluble membrane.

7. The process of claim 1 wherein said hydrocarbon mixture is obtained from an oil refining process.

8. The process of claim 1 wherein said hydrocarbon mixture is a light cracked naphtha.

9. The process of claim 1 wherein said sulfur compound is thiophene or a derivative of thiophene.

10. The process of claim 1 wherein said hydrophilic membrane is an ionic membrane.

11. The process of claim 10 wherein said membrane is selected from the polymers of perfluorosulfonic acid and derivatives thereof.

12. The process of claim 1 wherein said hydrophilic membrane is a water-soluble membrane.

13. The process of claim 1 wherein said hydrophilic membrane is a non-ionic membrane.

14. The process of claim 1 wherein said membrane comprises polyvinylpyrrolidone.

15. The process of claim 1 wherein said membrane comprises cellulose triacetate.

16. The process of claim 1 which is performed under pervaporation conditions.

17. The process of claim 1 which is performed under perstraction conditions.

18. The process of claim 2 wherein said membrane of said further membrane module is an ionic membrane.

19. The process of claim 18 wherein said membrane is selected from the polymers of perfluorosulfonic acid and derivatives thereof.

* * * * *